United States Patent
Wahlström et al.

(10) Patent No.: US 9,476,343 B2
(45) Date of Patent: Oct. 25, 2016

(54) DEVICE FOR PREVENTING THEFT OF A FIRST VEHICLE COMPONENT, WHICH IS RELEASABLY CONNECTED TO A SECOND VEHICLE COMPONENT

(75) Inventors: Gert-Ove Wahlström, Askim (SE); Christian Dansund, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/390,013

(22) PCT Filed: Apr. 17, 2012

(86) PCT No.: PCT/EP2012/001656
§ 371 (c)(1),
(2), (4) Date: Oct. 1, 2014

(87) PCT Pub. No.: WO2013/156040
PCT Pub. Date: Oct. 24, 2013

(65) Prior Publication Data
US 2015/0117941 A1    Apr. 30, 2015

(51) Int. Cl.
*B60R 25/00* (2013.01)
*F01N 13/18* (2010.01)

(52) U.S. Cl.
CPC ............ *F01N 13/1844* (2013.01); *B60R 25/00* (2013.01); *F01N 13/1855* (2013.01); *F01N 13/1838* (2013.01); *F01N 2260/22* (2013.01); *Y10T 403/58* (2015.01)

(58) Field of Classification Search
CPC ............... B60R 25/00; F01N 13/1844; F01N 13/1855; F01N 2260/22
See application file for complete search history.

(56) References Cited

U.S. PATENT DOCUMENTS

| | | | | |
|---|---|---|---|---|
| 5,675,997 | A * | 10/1997 | Hulak | B60R 25/00 70/14 |
| 6,584,768 | B1 * | 7/2003 | Hecker | F01N 3/035 55/318 |
| 2007/0169981 | A1 * | 7/2007 | Connelly | B60K 13/04 180/309 |
| 2009/0007551 | A1 * | 1/2009 | Wahlstrom | F01N 13/009 60/299 |
| 2010/0258703 | A1 | 10/2010 | Meislahn | |
| 2011/0036130 | A1 | 2/2011 | Hisler | |

(Continued)

FOREIGN PATENT DOCUMENTS

| | | |
|---|---|---|
| GB | 2481574 A | 1/2012 |
| JP | 2000110547 | 4/2000 |

(Continued)

OTHER PUBLICATIONS

International Preliminary Report on Patentability (Jul. 8, 2014) for corresponding International Appiication PCT/EP2012/001656.

(Continued)

*Primary Examiner* — Barry Gooden, Jr.
(74) *Attorney, Agent, or Firm* — WRB-IP LLP

(57) ABSTRACT

A device is provided for preventing theft of a first vehicle component which is releasably connected to a second vehicle component. The theft preventing device includes a cover member arranged for obstructing removal of the first component from the second component and a locking member, which is configured for locking the cover member or the second component in an operational position in which the cover member obstructs the removal of the first component from the second component.

20 Claims, 14 Drawing Sheets

(56) References Cited

U.S. PATENT DOCUMENTS

| | | |
|---|---|---|
| 2011/0253471 A1 | 10/2011 | Dusa |
| 2013/0300550 A1* | 11/2013 | Potter .................... B60R 25/20 340/429 |

FOREIGN PATENT DOCUMENTS

| | | |
|---|---|---|
| JP | 3091796 | 2/2003 |
| JP | 2004231009 | 8/2004 |
| JP | 2007226807 | 8/2007 |

OTHER PUBLICATIONS

International Search Report (Jan. 15, 2013) for corresponding International Application PCT/EP2012/001656.

Japanese Official Action (translation) (Dec. 22, 2015) for corresponding Japanese App. 2015-506100.

* cited by examiner

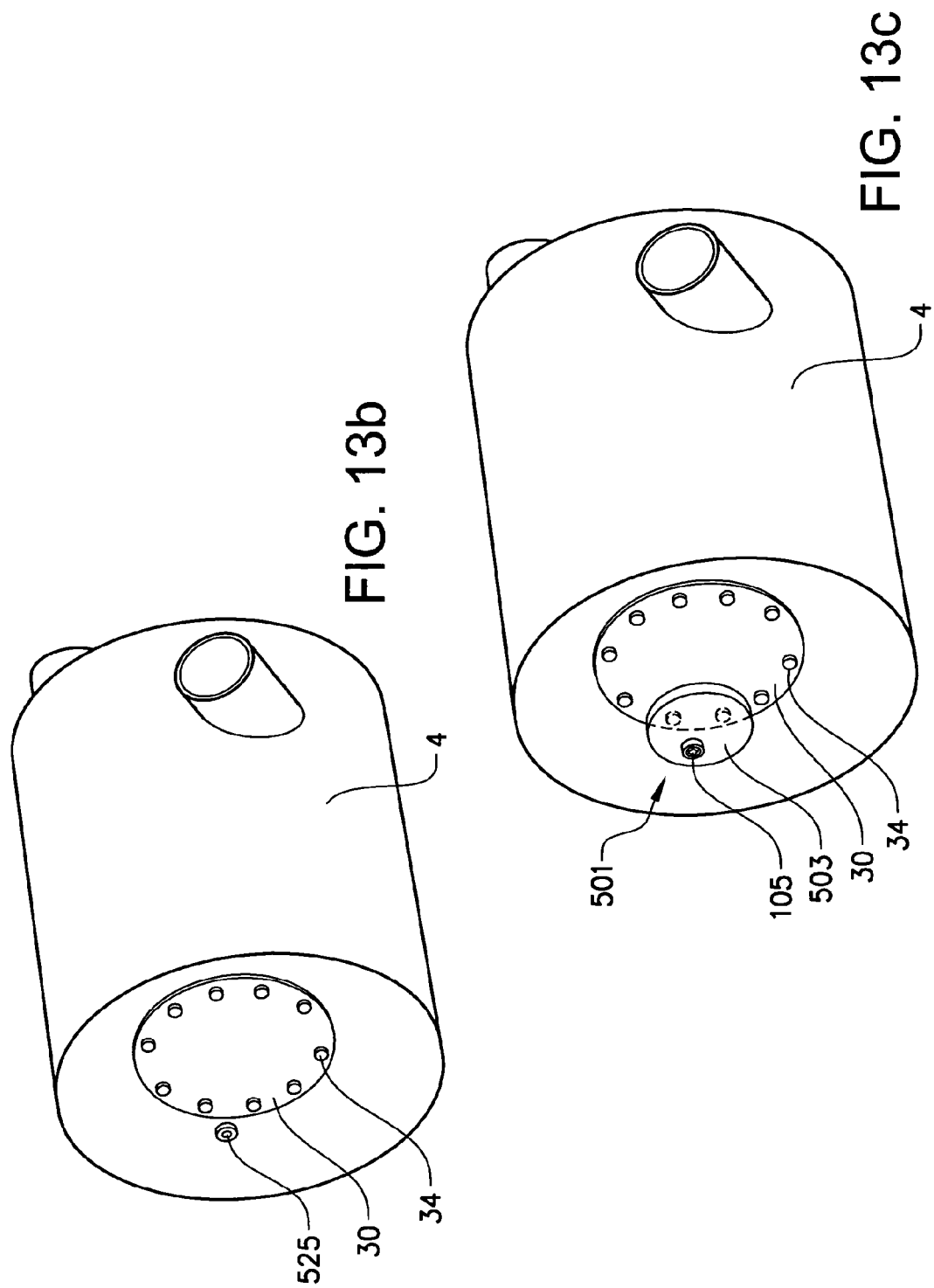

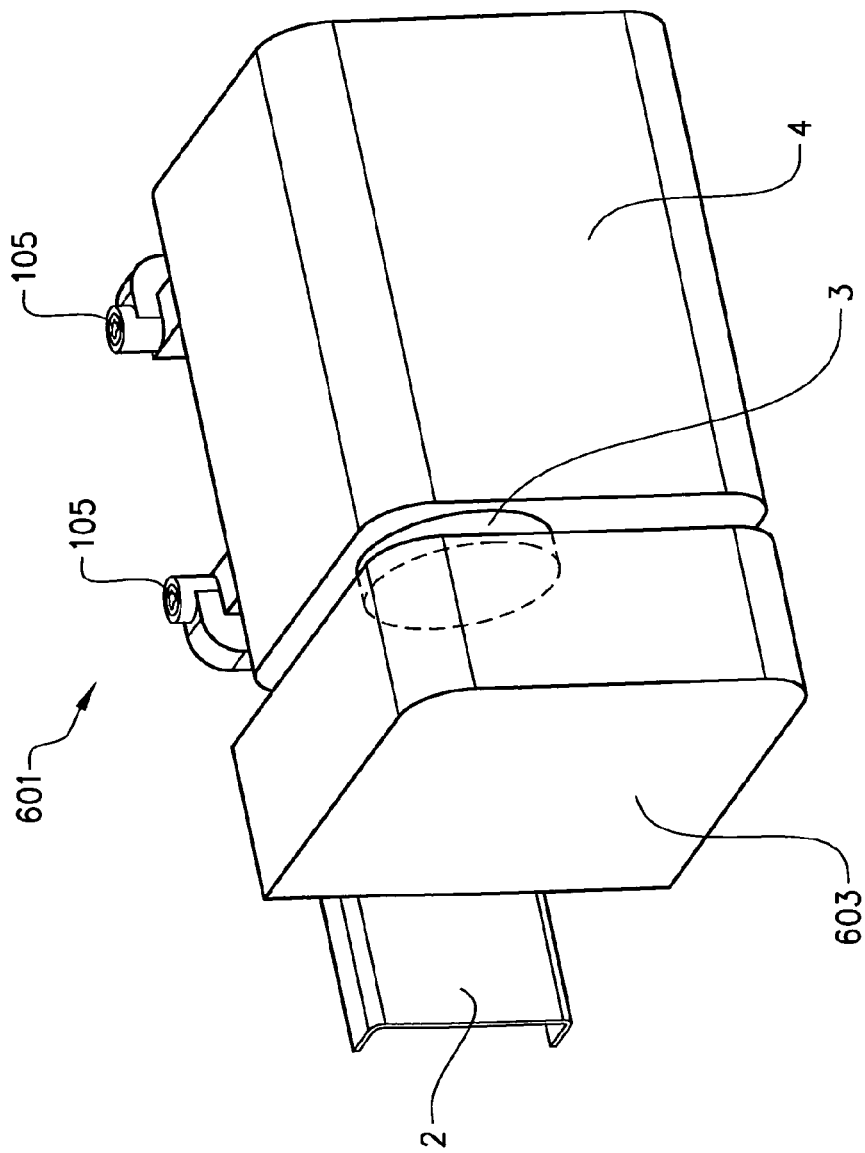

DEVICE FOR PREVENTING THEFT OF A FIRST VEHICLE COMPONENT, WHICH IS RELEASABLY CONNECTED TO A SECOND VEHICLE COMPONENT

BACKGROUND AND SUMMARY

The present invention relates to a device for preventing theft of a first vehicle component, which is releasably connected to a second vehicle component. A commercial vehicle, such as a truck or bus, may comprise a diesel engine as power source and an exhaust gas aftertreatment system. The exhaust gas aftertreatment system in turn comprises different exhaust gas aftertreatment units, such as a diesel particulate filter. The first vehicle component may be formed by such a diesel particulate filter.

The diesel particulate filter is often arranged within a container for a muffler (sound dampening unit). The second vehicle component mentioned above may therefore be formed by such a muffler container. The muffler container is in turn attached to a frame member of the commercial vehicle.

The primary function of a diesel particulate filter is to collect (filtering) soot and oxidise (burn) it. In order to enhance that soot oxidation many filters are coated with a catalytic coating that contains considerable amounts of precious metals such as platinum and palladium, which are expensive metals. Further, the process to manufacture the filter itself is fairly complicated, resulting in that the diesel particulate filter adds up to be a fairly costly component.

Due to that the diesel particulate filter also collects inorganic products, usually called ash, it has to be regularly serviced and is therefore arranged in a way that it is easy to dismount and replace. Especially, the diesel particulate filter may have a cylindrical shape and be received in a correspondingly shaped recess in the muffler container. The muffler container is in turn attached to a frame member of the commercial vehicle so that the diesel particulate filter may be released from the muffler container and withdrawn from the muffler container while the muffler container is attached to the vehicle frame. The muffler container may be attached to the vehicle so that the diesel particulate filter is accessible from a side of the vehicle and may be withdrawn in a transverse direction in relation to a longitudinal direction of the vehicle.

On some designs, it will only take a few minutes with normal hand tools to dismount a filter insert from a parked vehicle. The weight is only around 15 kg and possible to carry away fairly easy. The muffler may weigh around 150 kg, making it harder to remove and carry away from the vehicle.

Due to the fact that the diesel particulate filter is a valuable component, which is very easy to dismount, there is a desire to achieve a device for preventing theft of the diesel particulate filter.

It is desirable to achieve a device for preventing theft of a first vehicle component (such as the diesel particulate filter), which is releasably connected to a second vehicle component (such as a muffler), which device is cost-efficient and easily operated by a service technician by means of relevant tools.

According to a first aspect of the invention, the theft preventing device comprises a cover member configured for obstructing removal of said first component from said second component and a locking member, which is configured for locking the cover member or the second component in an operational position in which the cover member obstructs said removal of said first component from said second component.

Thus, the cover member obstructs removal of said first component from said second component when arranged in its intended operational position. In other words, even if someone would manage to release said first component from said second component, a physical separation of said first and second components is obstructed.

According to a preferred embodiment, the cover member comprises a material, which is sufficiently hard for substantially withstanding impact by a foreign object. The cover member being "sufficiently hard for substantially withstanding impact by a foreign object" should be interpreted in the light of the purpose of the invention is preventing theft. Thus, "sufficiently hard" should be interpreted as substantially non-deformable by means of a handheld tool, such as a crow bar or other elongated object, which may be used by a person for hitting/bending the cover member. Such a design makes it difficult to damage/displace the cover member enough for removing the first vehicle component. Preferably, said material may be hardened steel.

Preferably, the cover member is in its entirety formed by said material, which is sufficiently hard for substantially withstanding impact by a foreign object.

According to a further preferred embodiment, the locking member comprises an individual engagement pattern configured for mating only with a corresponding engagement pattern of a service tool. Such a design makes it substantially more difficult to operate the locking member for unlocking the cover member without the associated service key/adapter tool.

Preferably, the locking member comprises a bolt of the wheel lock bolt type with an individual engagement pattern. Such wheel lock bolts are known for locking a wheel to a wheel hub within the automotive industry and thereby deter theft of the wheel.

According to a further preferred embodiment, the locking member is configured for fastening the cover member to the second vehicle component in said operational position. Preferably, the second vehicle component is configured for said fastening, for example via a threaded opening for engagement with a locking bolt forming the locking member. Said threaded opening is preferably positioned in the vicinity of the operational position of the first vehicle component so that an extension of the cover member between the locking bolt and the first component is minimized.

According to a conventional design, the second component comprises an opening for receiving the first component and wherein the first component is configured for withdrawal from the second component in a first direction via said opening. According to an embodiment adapted for that conventional design, the cover member is configured for obstructing withdrawal of the first component from the second component. Since such an opening normally has a closed bottom, the first component is positioned in the opening via linear movement towards its intended position and withdrawn from its intended position via a linear movement in the opposite direction. By designing the cover member for obstructing said withdrawal and attaching the cover member such that said withdrawal is blocked, theft of the first vehicle component is deterred.

The first component, when formed by a diesel particulate filter, normally has a circular-cylindrical shape and is received in said opening of a corresponding shape and dimension in the second component, when formed by a muffler container.

According to the conventional design, the first component comprises a flange at least partly surrounding the first component. The second vehicle component is then provided with a corresponding flanges for connection of the two vehicle components. According to an embodiment adapted for that conventional design, the cover is configured to at least partly overlap the flange for obstructing said withdrawal of the first component in said first direction.

Preferably, the cover member has a shape that matches a part of the exterior of the first vehicle component. Further, the cover member extends only around a portion of the first vehicle component, wherein the portion is less than 180 degrees, and specifically less than 90 degrees.

According to the conventional design, the first component is fastened to the second component in an operational position via a fastener. According to an embodiment adapted for that conventional design the locking member is configured for locking the cover member for obstructing access for releasing said fastener. Thus, the cover member is designed for both obstructing access to the fastener and for obstructing release of the first component from the second component. For example, the first component may be fastened to the second component in an operational position via a flexible clamping ring, wherein the fastener, in the form of a screw, is configured for tightening the ring. The clamping ring is normally configured to clamp the first component to the second component via flanges extending from the vehicle components.

According to a further preferred embodiment, the cover member comprises a first plate shaped portion, which is configured for obstructing removal of said first component from said second component. This design creates conditions for a cost-efficient production, wherein a metal sheet may be used for forming the cover member.

According to a further development of the last-mentioned embodiment, the cover member comprises a second plate shaped portion, which is formed in a one-piece unit with the first plate-shaped portion, wherein the first and second plate shaped portions extend in different directions, and that the second portion is configured for obstructing access to said fastener. This design may be achieved via cutting a metal sheet material to a desired shape and then bending the metal sheet to form the cover member.

BRIEF DESCRIPTION OF THE DRAWINGS

The present invention together with the above mentioned and other objects and advantages may best be understood from the following detailed description of the embodiments, but not restricted to the embodiments, wherein is shown schematically:

FIGS. 13a-d shows an alternative arrangement of the diesel particulate filter and the muffler and a fifth embodiment of an anti-theft device, and FIGS. 14a-b shows a further alternative arrangement of the diesel particulate filter and the muffler and a sixth embodiment of an anti-theft device

DETAILED DESCRIPTION

Figure 1:
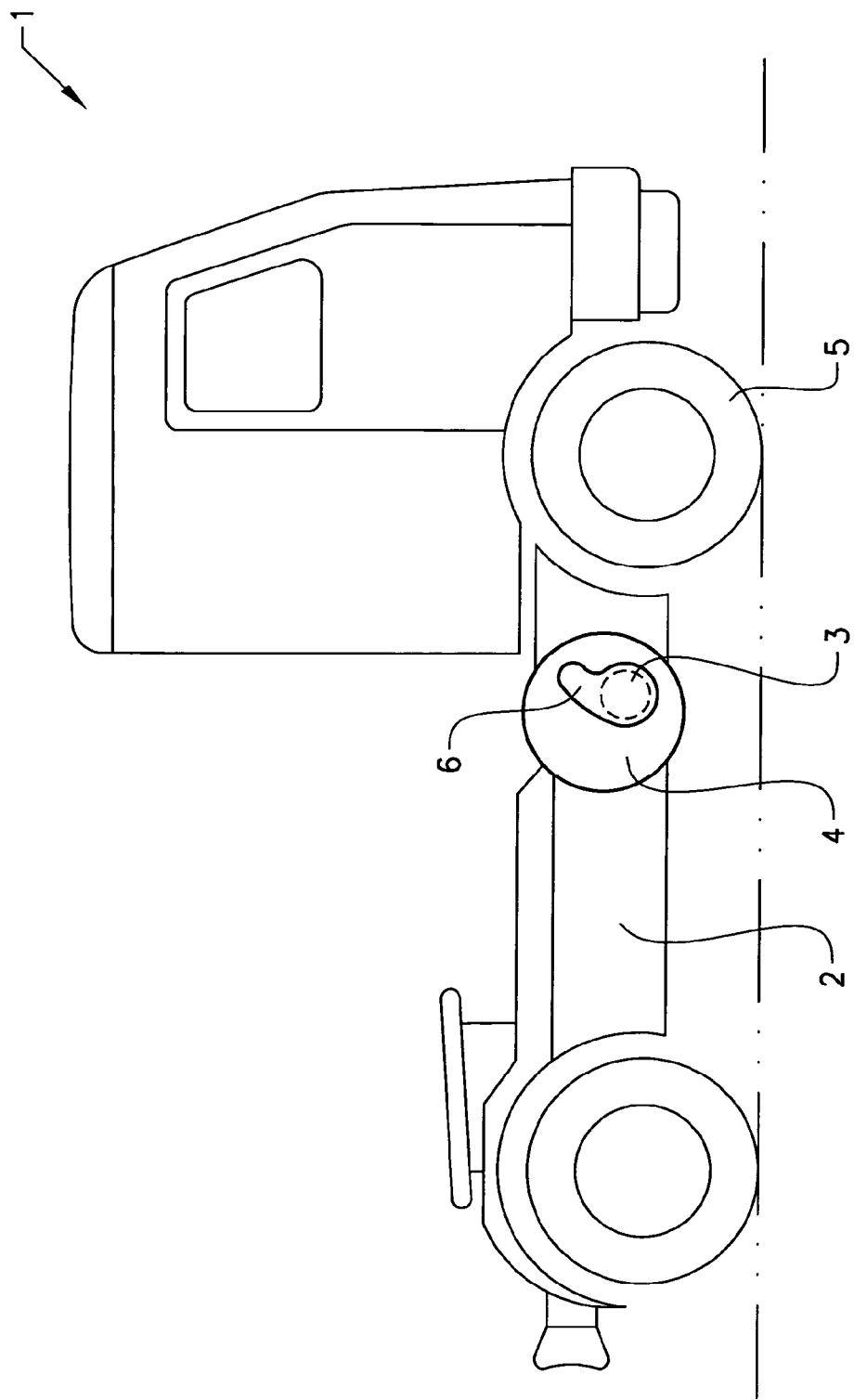
FIG. 1 depicts a side view of a truck, wherein the position of a muffler housing a diesel particulate filter is shown.

FIG. 1 shows a truck 1 in a side view. The truck comprises a pair of frame members 2 extending in a longitudinal direction of the truck and arranged at a distance from each other in a transversal direction of the truck. A first vehicle component 3, in the form of an exhaust gas aftertreatment unit and more specifically a diesel particulate filter, is indicated with dotted lines. A second vehicle component 4, in the form of a muffler container, is positioned behind a front wheel 5 of the truck 1 and attached to the frame member 2. The first vehicle component 3 is housed in an opening in the second vehicle component 4 such that a side face is exposed from a side of the truck. A conduit member 6 is arranged over the opening for conveying an exhaust gas flow from the diesel particulate filter to the muffler or vice versa. The conduit member 6 also forms a cover for covering the exposed side of the diesel particulate filter 3.

Figure 2:
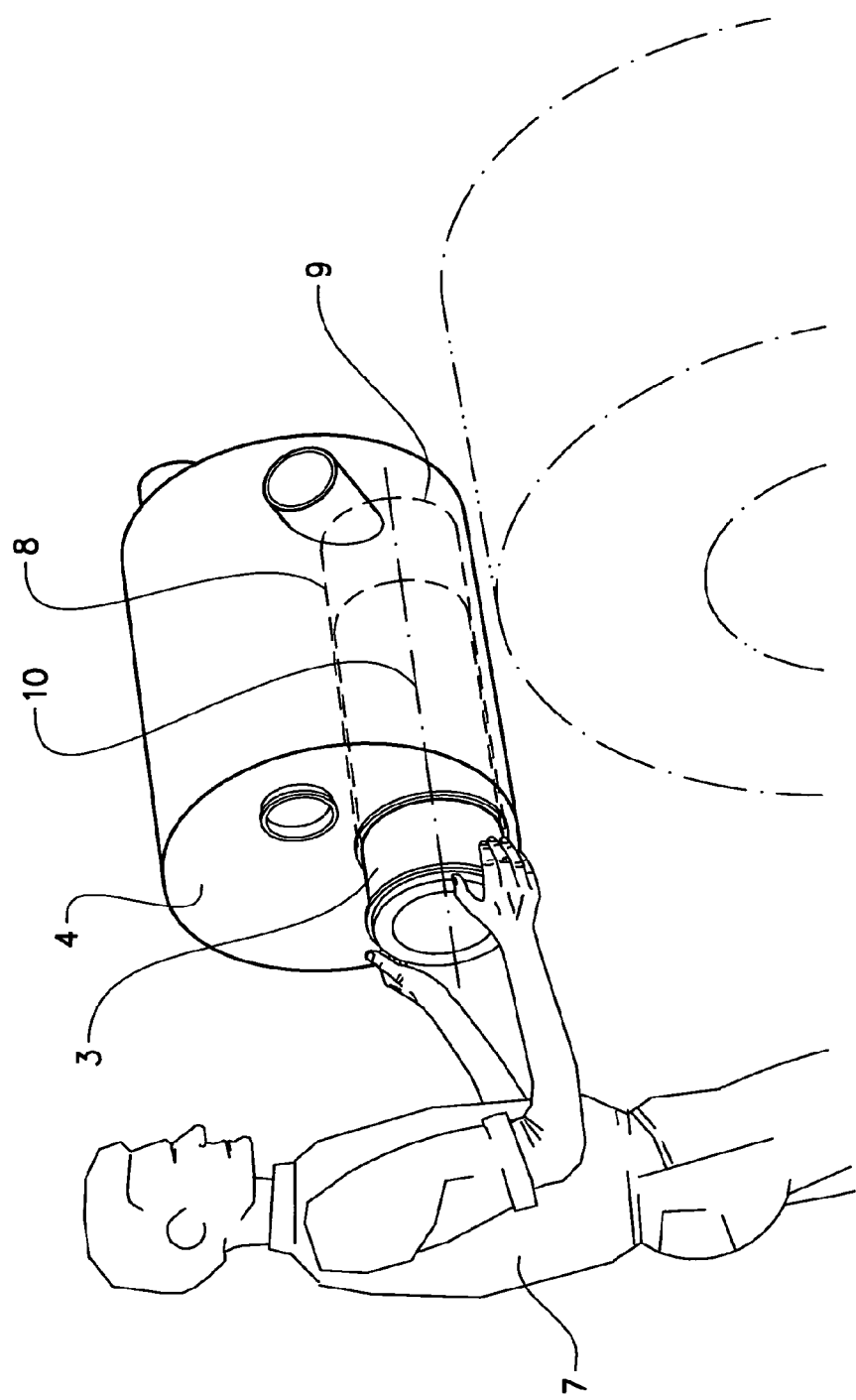
FIG. 2 shows removal of the diesel particulate filter from the muffler in FIG. 1.

FIG. 2 shows an enlarged perspective view of the muffler 4 in FIG. 1. A service technician 7 is about to remove the diesel particulate filter 3 from the muffler 4 for exchange/service. The muffler 4 is attached to the frame member 2 during the complete exchange/service process. Thus, the muffler 4 is stationary during the complete exchange/service process. In FIG. 2, an opening 8 in the muffler 4 for the diesel particulate filter 3 is shown. The opening 8 has a bottom end 9 forming a stop for the diesel particulate filter 3. The opening 8 defines a movement direction 10 for insertion of the diesel particulate filter 3 to its operational position. More specifically, the diesel particulate filter 3 and the opening 8 are designed for a relative linear movement of the diesel particulate filter 3 towards its operational position and during removal movement in the opposite direction.

The diesel particulate filter 3 has a circular cylindrical shape. The circular cylindrical shape may be defined as a three-dimensional surface bounded by a curved surface and two parallel circles of equal size at the ends. The curved surface is formed by all the line segments joining corresponding points of the two parallel circles. The opening 8 has a corresponding design as the filter 3 with regard to shape and dimension.

Figure 3:
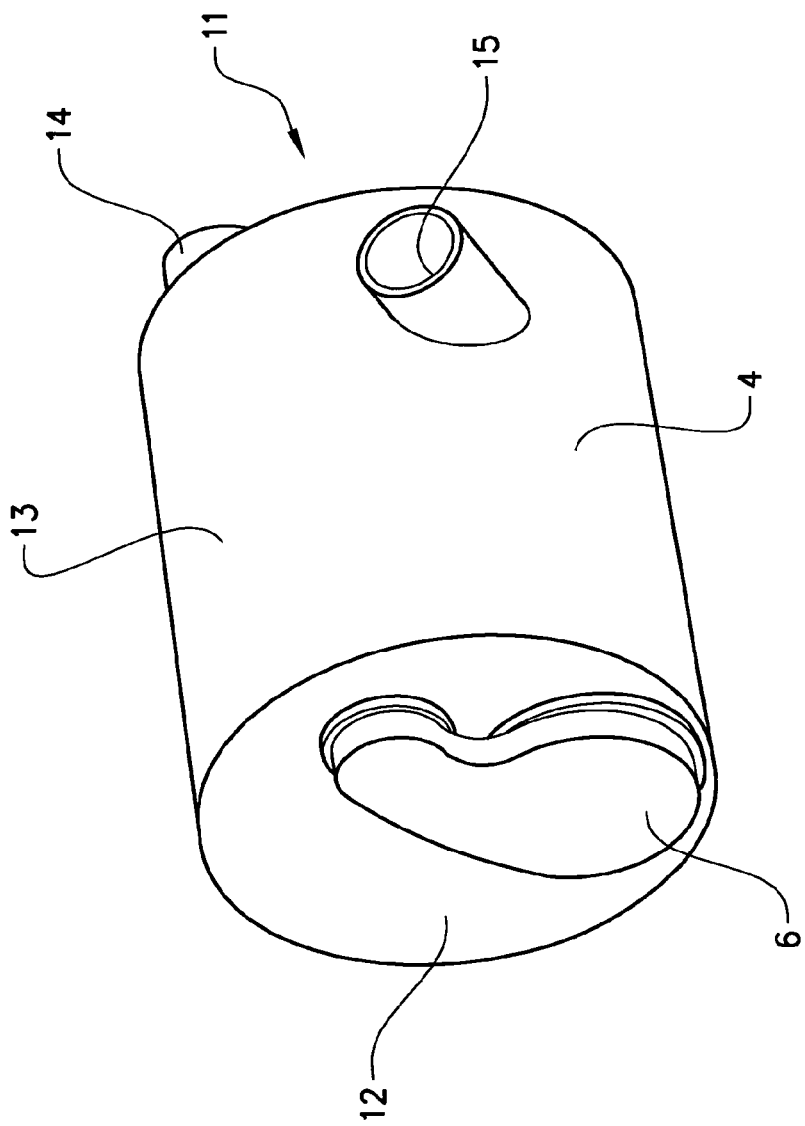
FIG. 3 shows the muffler from FIG. 1 in a perspective view.

FIG. 3 shows the muffler 4 in a perspective view, the muffler 4 being designed in the form of a drum and comprises a circular front-end wall 11 and a circular rear-end wall 12; and a hollow at least partially cylindrical circumferential outside wall 13, which connects both end walls 11, 12. An exhaust conduit 14 and an intake conduit 15 are provided for conveying an exhaust gas flow. In other words, the second component 4 is formed by a cylindrical casing for housing said first component 3.

Figure 4:
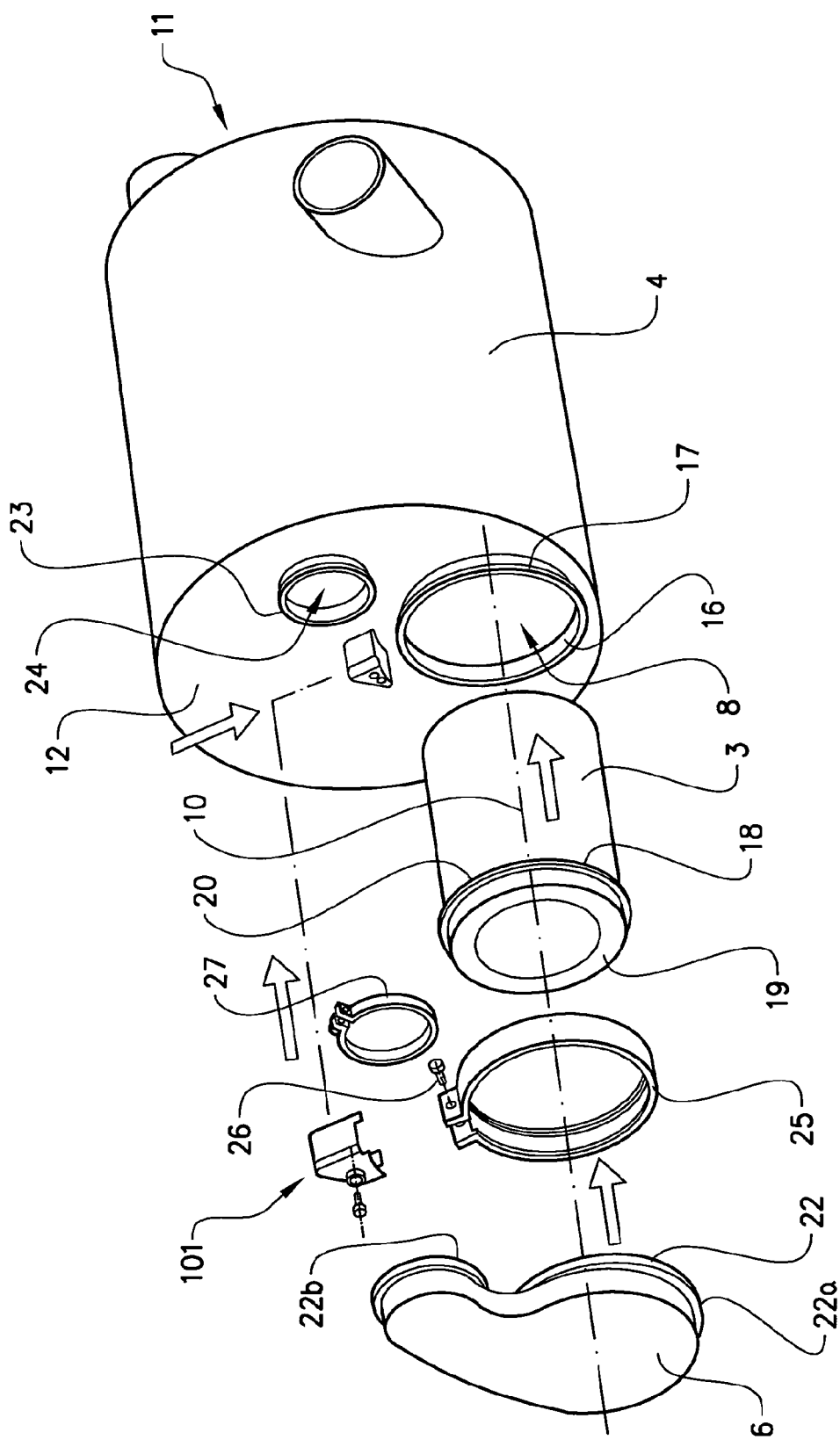
FIG. 4 shows the muffler from FIG. 3, the diesel particulate filter, and an associated anti-theft device according to a first embodiment of the invention in an exploded view, FIG. 5a schematically shows installation of the anti- and 5b theft device in FIG. 4 in an enlarged perspective view.

FIG. 4 shows an exploded view of a portion of the muffler 4 with the particulate filter 3 and the U-shaped conduit 6 removed. As indicated in FIG. 4, the opening 8 in the rear end wall 12 comprises a tubular outlet 16 with a first flange 17. The first flange 17 is arranged to cooperate with and seal against a circumferential flange 18 located adjacent a rear, first end 19 of the particulate filter 3. A first ring shaped seal or O-ring 20 is placed between the flanges 17, 18 to ensure that the connection is gas tight during normal operation. A second ring shaped seal or O-ring 22 is placed between the circumferential flange 18 and a first flange 22a at the inlet end of the U-shaped conduit 6 for the same purpose. A second flange 22b is configured to seal in relation to a second flange 23 at a second opening 24 in the rear end wall 12.

A first flexible clamping ring 25 is arranged to hold the particular filter 3 in place, while clamping the filter flange 18 to the muffler flange 17. The clamping ring 25 is discontinuous in the circumferential direction, forming a gap between the ring ends. A fastener 26, in the form of a screw, is arranged at the ring ends and configured for tightening the ring 25 in a conventional manner. The flexibility of the clamping ring 25 allows it to be placed over the respective flanges and tightened to seal the connection between the muffler 4 and the filter 3. A second clamping ring 27 is arranged to fasten the conduit 6 to the second flange 23. This type of clamping rings is known in the art and will not be described in further detail. The above-mentioned seals can form integral parts of the sealing surfaces and/or comprise separate, removable seals such as O-rings. FIG. 4 also indicates a theft preventing device 101, which will be shown in more detail in FIGS. 5-8.

Figure 5A:
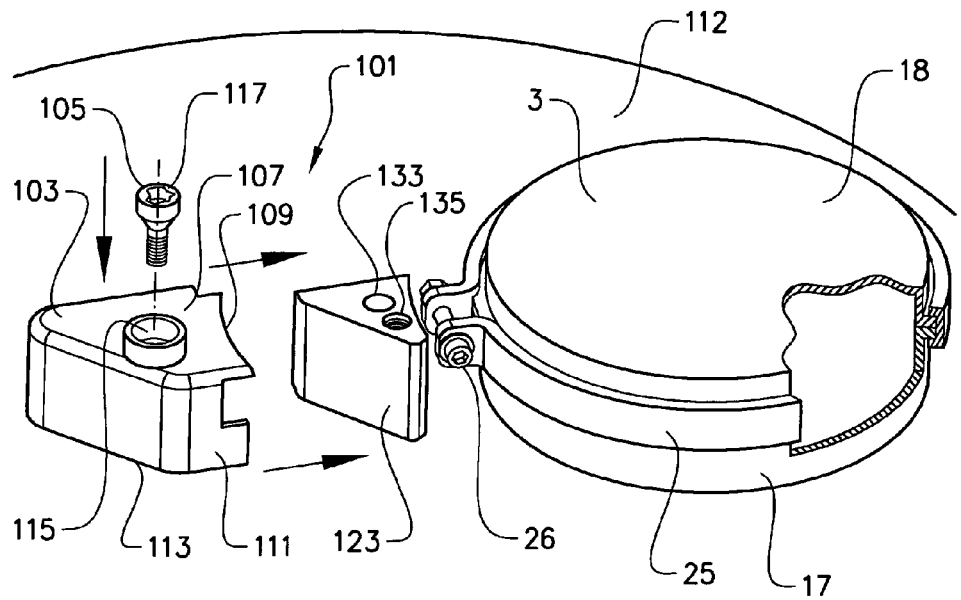
Figure 5B:
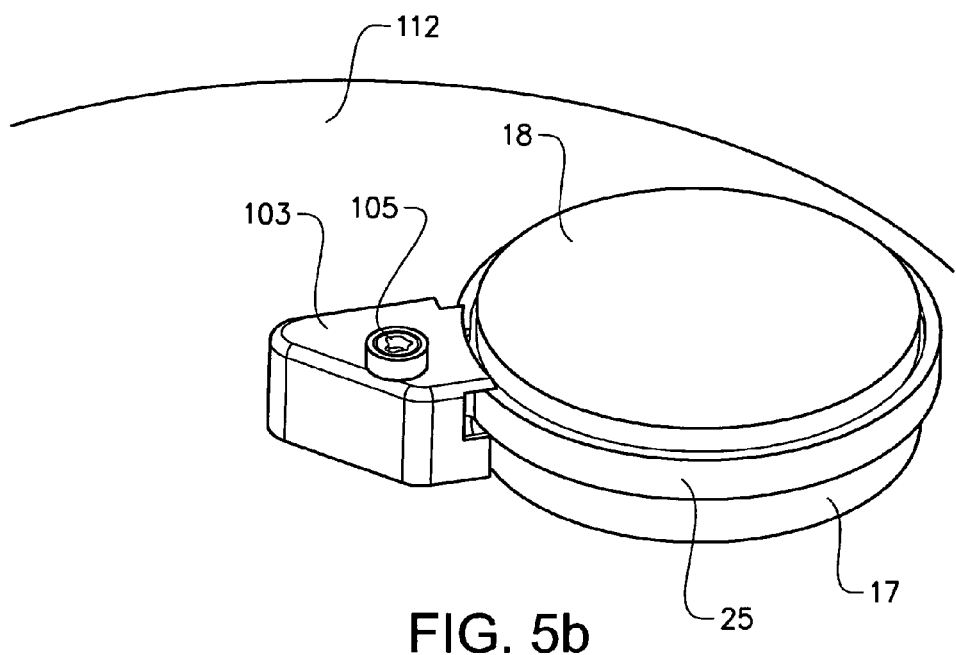

FIG. 5a shows the theft preventing device 101 in a perspective exploded view. The theft preventing device 101 comprises a cover member 103 arranged for obstructing removal of said first component 3 (the diesel particulate filter) from said second component 4 (the muffler). More specifically, the cover member 103 is configured for obstructing withdrawal of the first component 3 from the second component 4.

The cover member 103 comprises a material, which is sufficiently hard for substantially withstanding impact by a foreign object. Thus, the cover member 103 is of a substantially non-deformable material. In other words, the cover member 103 is of a rigid character. The cover member 103 preferably comprises a metallic material and especially a hardened steel material that is very hard to deform.

The cover member 103 comprises a first plate shaped portion 107, which is configured for obstructing separation of said first component 3 from said second component 4. The plate shaped portion 107 is configured to at least partly overlap with a boundary of the first component 3 in said first direction when the cover member is in its active position. The plate shaped portion 107 has an edge 109 with an extension direction along an extension direction of the first component 3 and/or clamping ring 25. In other words, the shape of the edge 109 matches the external shape of the first component 3 and/or clamping ring 25. Preferably, the plate shaped portion 107 is configured so that the edge 109 abuts or at least is in closed vicinity of the first component 3 and/or clamping ring 25 when the theft preventing device is in a locked state, see FIG. 5b. In this way, access to the parts inside the cover member 103 is minimized.

In its desired position, the plate shaped portion 107 is substantially in parallel with an end surface 112 of the second vehicle component 4.

The cover member 103 comprises a second plate shaped portion 111, which is formed in a one-piece unit with the first plate-shaped portion 107. The first and second plate shaped portions 107,111 extend in different directions. In the shown embodiment, the first and second plate shaped portions 107,111 extend at right angles in relation to each other. More specifically, each of the first and second plate shaped portions 107,111 extend in a plane and the two planes intersect. In the shown embodiment, the second plate shaped portion 111 extends around a substantial part of the first plate shaped portion 107. More specifically, the second plate shaped portion 111 extends around the first plate shaped portion 107 on all sides except the side comprising said edge 109. The cover member 103 is configured so that an edge 113 of the second plate shaped portion 111 will abut against the end surface 112 of the second vehicle component 4 when the cover member is in its locked position. The second portion 111 is configured for obstructing access to said fastener 26.

The cover member 103 is preferably formed from a blank, which is cut and folded to the final shape comprising the first and second plate shaped portions 107,111 as folded sides.

The cover member 103 is configured to at least partly overlap the flange 18 for obstructing said withdrawal of the first component in said first direction.

The theft preventing device 101 further comprises a locking member 105, which is configured for locking the cover member 103 in an operational position in which the cover member obstructs said removal of said first component 3 from said second component 4. The locking member 105 has an elongated shape and is configured for mating with a correspondingly shaped recess. Further, the cover member 103 comprises an opening 115 for receiving said locking member 105. The locking member 105 comprises male or female portions configured for mating with corresponding female or male portions of a service tool. More specifically, the locking member 105 comprises an individual engagement pattern 117 configured for mating only with a corresponding engagement pattern 119 of a service tool 121, see FIG. 8. The individual engagement pattern 117 is provided as a recess at a first end of the elongated locking member 105 and accessible via a relative movement in the longitudinal direction of the locking member 105. The locking member 105 is cylindrical and provided with threads at a second end opposite the first end. More specifically, the locking member 105 comprises a bolt of the wheel lock bolt type with an individual engagement pattern. The locking member 105 is configured for fastening the cover member 103 to the second component 4 in said operational position. The cover member 103 is provided with a collar around the bolt head of the lock-bolt in order to protect the sides of the bolt head from being accessed.

The theft preventing device 101 further comprises a support member 123, which is configured for bridging the distance between the first plate-shaped portion 107 and the end surface 112 of the second vehicle component 4. The support member 123 is configured for being rigidly connected to the second component 4 and mating with said locking member 105. The support member 123 has an external shape matching an internal shape of the cover member 103 for forming a rigid construction.

Figure 6:
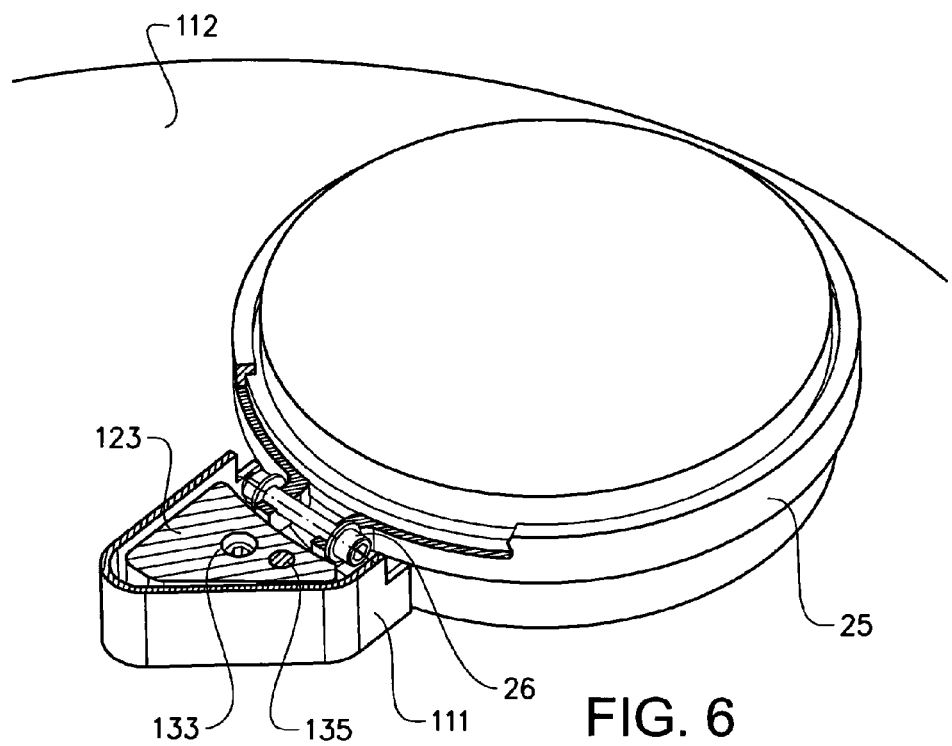
FIG. 6 shows the anti-theft device in FIG. 4 in a perspective view cut along a horizontal plane.
Figure 7:
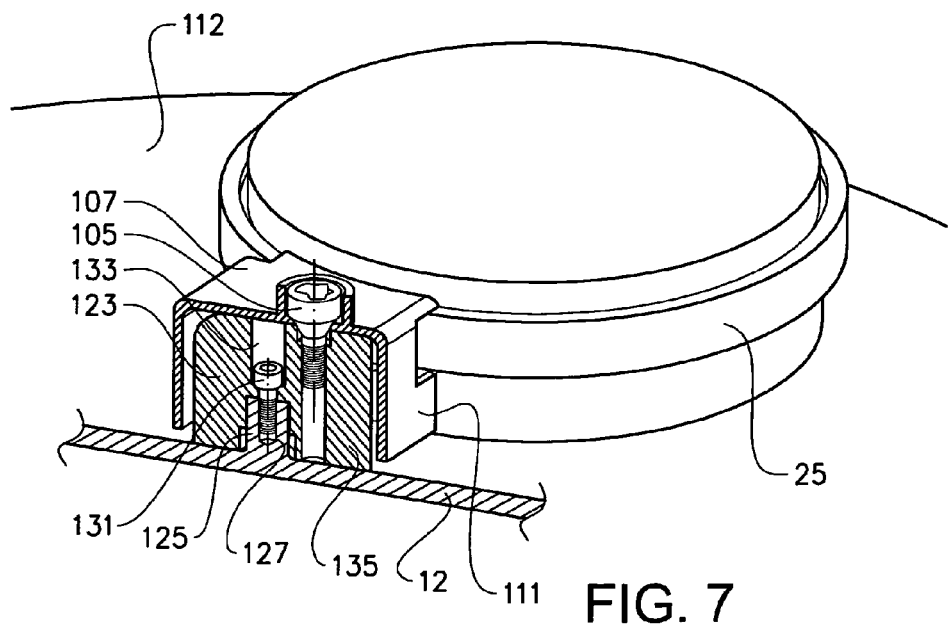
FIG. 7 shows the anti-theft device in FIG. 4 in a perspective view cut along a vertical plane.
Figure 8:
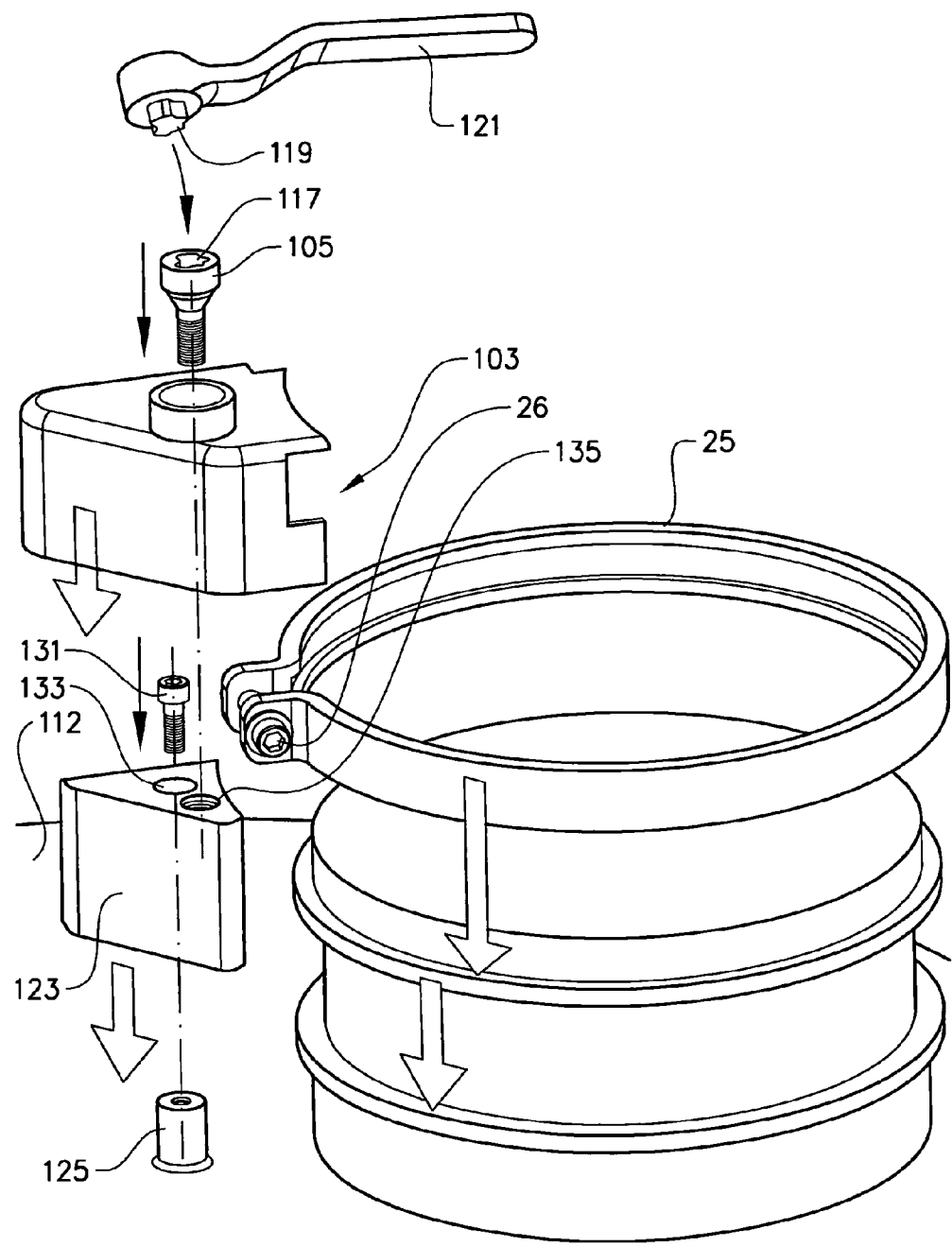
FIG. 8 shows operation of the anti-theft device in FIG. 4 in an exploded perspective view.

Referring now also to FIG. 6-8, the support member 123 comprises two holes 133,135. A first hole 133 is formed by a through hole and configured for receiving a screw 131 for rigidly attaching the support member 123 to the second vehicle component 4. A second hole 135 is threaded and configured for mating with the threads of the locking member 105 for attaching the cover member 103 to the support member 123.

The second vehicle component 4 comprises a lock portion 125, or boss, see FIG. 7-8, for engagement with said screw

131. Said lock portion 125 forms a projection extending form a plane or curved surface, and more specifically from the end surface 112 of said second component 4. The projection 125 comprises a threaded recess 127 for attaching the support member 123 to the second vehicle component 4 by means of the screw 131. The projection 125 is preferably pre-attached to the side wall 12 of the second vehicle component 4 via welding or similar.

The first hole 133 comprises a first wide part configured for receiving the projection 125 from one side and a second more narrow part for receiving the screw 131 from the other side. Further, the first hole 133 comprises a third portion inbetween the first and second portions, which third portion is more narrow than the second portion. The third, intermediate part forms a stop for the screw 131 for securing the support member 123 to the second component 4.

Figure 9:
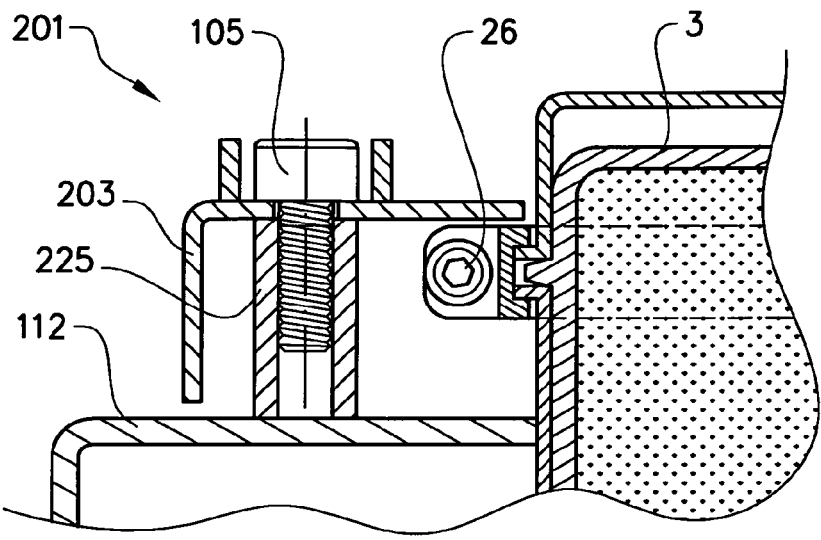
FIGS. 9-10 shows a second and third embodiment of an anti-theft device.

FIG. 9 shows a second embodiment of an anti-theft device 201, wherein the main difference in relation to the first embodiment is that there is no support member 123. Instead, the locking member 105 is attached directly to a projection 225 for locking a cover member 203 to the second component 4. This embodiment may be advantageous in the case that the fastener 26 for the clamping ring is located relatively close to the end surface 112 of the second component 4.

Figure 10:
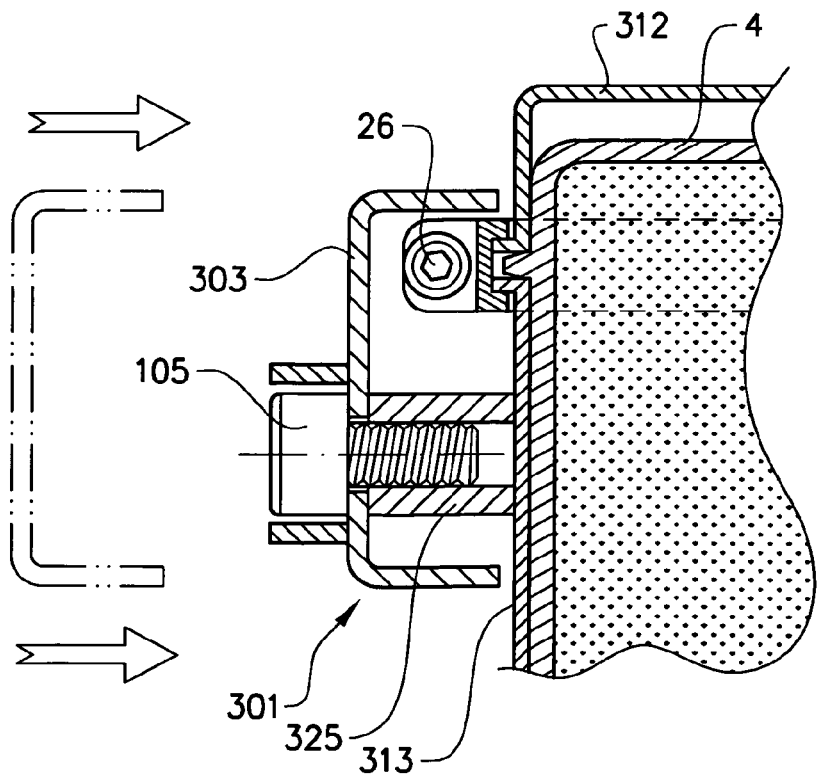

FIG. 10 shows a third embodiment of an anti-theft device 301, wherein the main difference in relation to the second embodiment is that the projection 325 extends from an envelope wall 313 instead of from the end wall 312 of the cylindrical second component 4. The locking member 105 is attached directly to a projection 325 for locking a cover member 303 to the second component 4.

Figure 11:
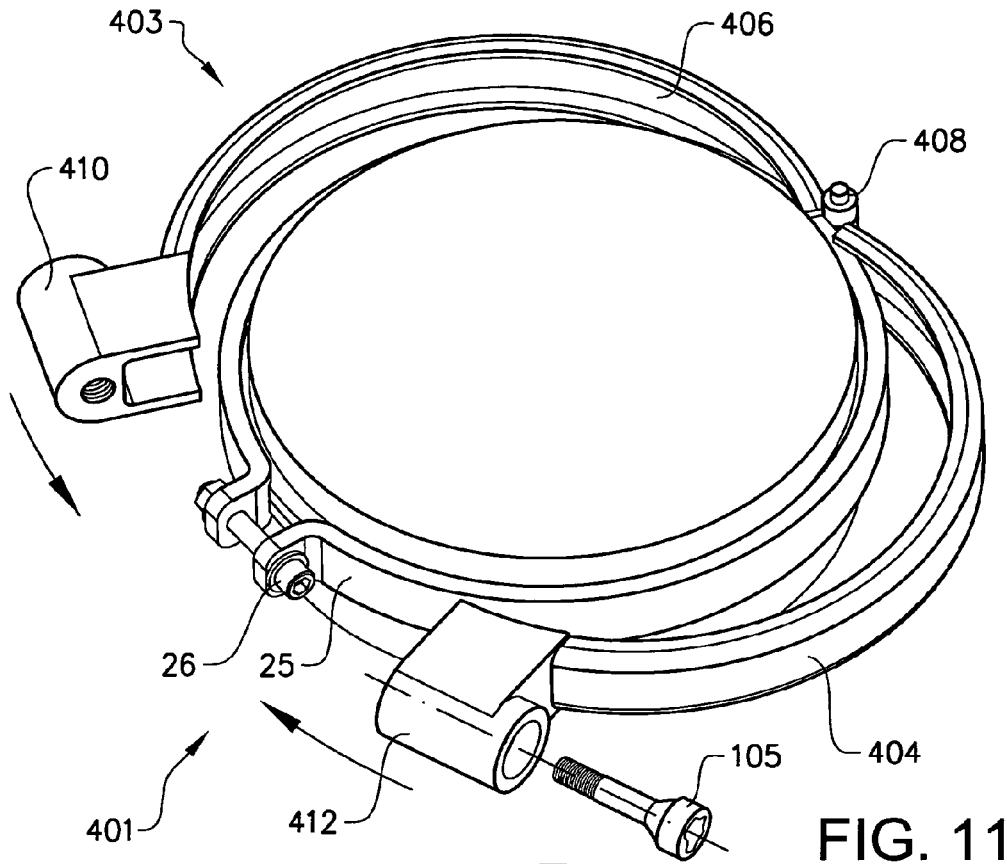
FIGS. 11-12 shows a fourth embodiment of an anti-theft device.
Figure 12:
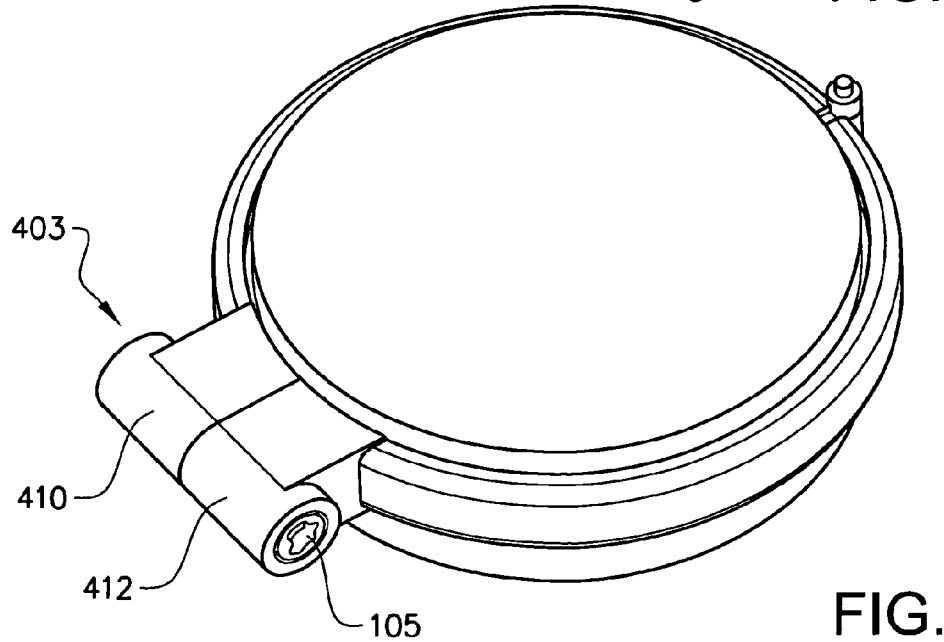

FIG. 11-12 shows a fourth embodiment of an anti-theft device 401. The anti-theft device 401 comprises a cover member 403, which comprises a substantially rigid ring shaped part 404,406 configured for surrounding said first component 3. More specifically, the cover member 403 comprises two ring parts 404, 406 and a hinge 408 for relative motion between the two ring parts. The cover member 403 further comprises two ring end parts 410,412, which are configured for being connected via the locking member 105. The cover member 403 is configured for at least substantially covering the clamping ring 25 and the associated tensioning screw 26.

Figure 13A:
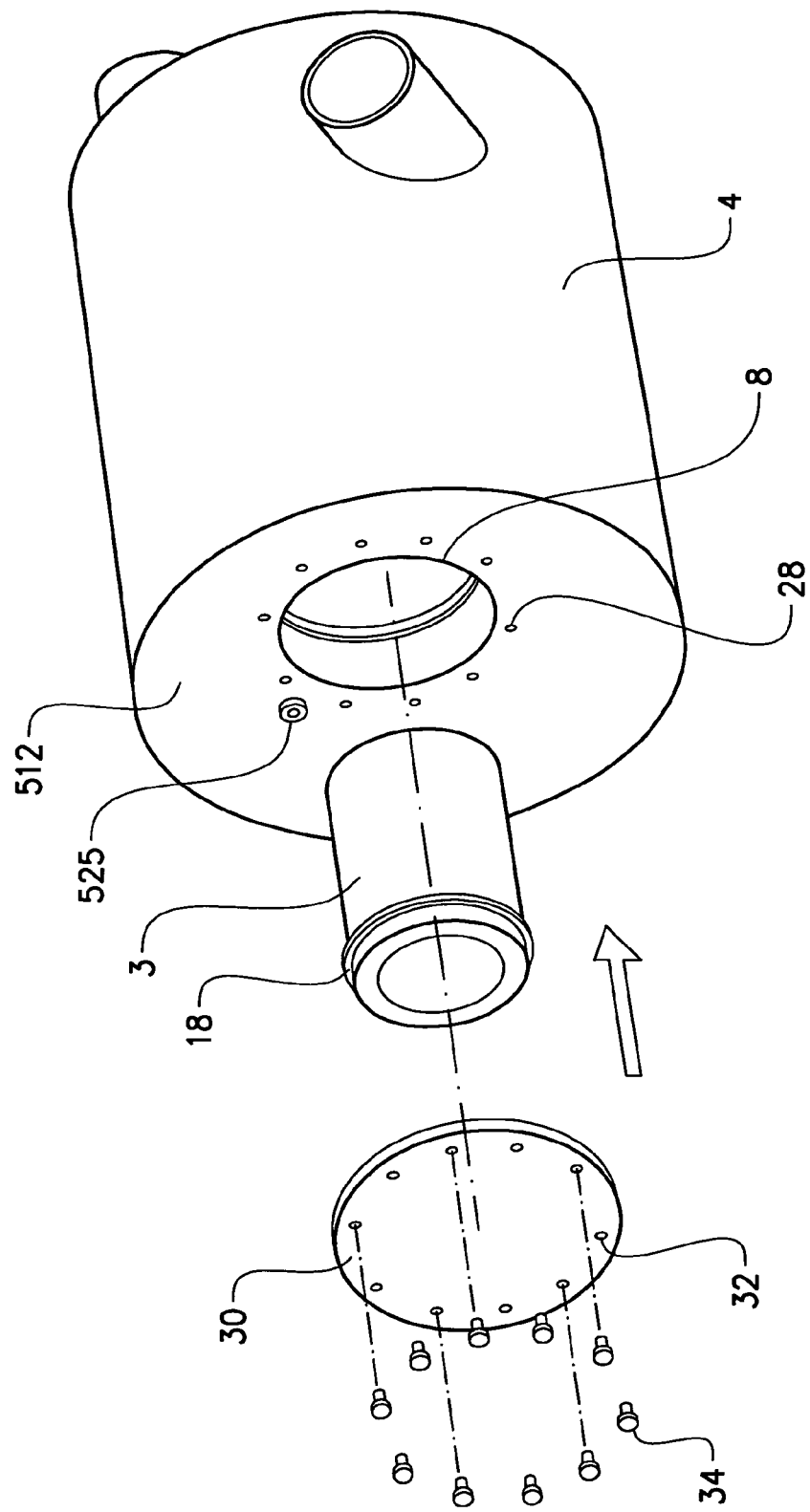

FIG. 13a-b shows an alternative arrangement of the diesel particulate filter 3 and the muffler 4. A main difference in relation to the first embodiment is that the filter 3 is internally connected to the muffler 4 by means of clamping rings or screw connections or in any other way known in the art, see an example in FIG. 13d. This connection is releasable through the same opening as the filter opening 8. A plurality of spaced screw holes 28 are arranged in the second component 4 around the filter opening 8. A cover plate 30 for protecting the filter 3 is also provided with a plurality of screw holes 32. The cover plate 30 is intended to be positioned so that each of the screw holes 32 of the cover plate is in line with the screw holes 28 of the muffler 4. A plurality of screws 34 are configured to lock the cover plate 30 to the muffler 4 via said screw holes 28,32.

The muffler 4 comprises a projection 525 for an anti-theft device 501 extending from an end surface 512 of the muffler 4 in the vicinity of the opening 8 and outside the circumference of the cover plate 30.

FIG. 13c shows the anti-theft device 501 comprising a substantially flat cover member 503 configured to cover a portion of the cover plate 30 in its intended operational position. The cover member 503 comprises a through hole for receiving the locking member 105, which is configured to lock the cover member 30 to the muffler 4.

Figure 13D:
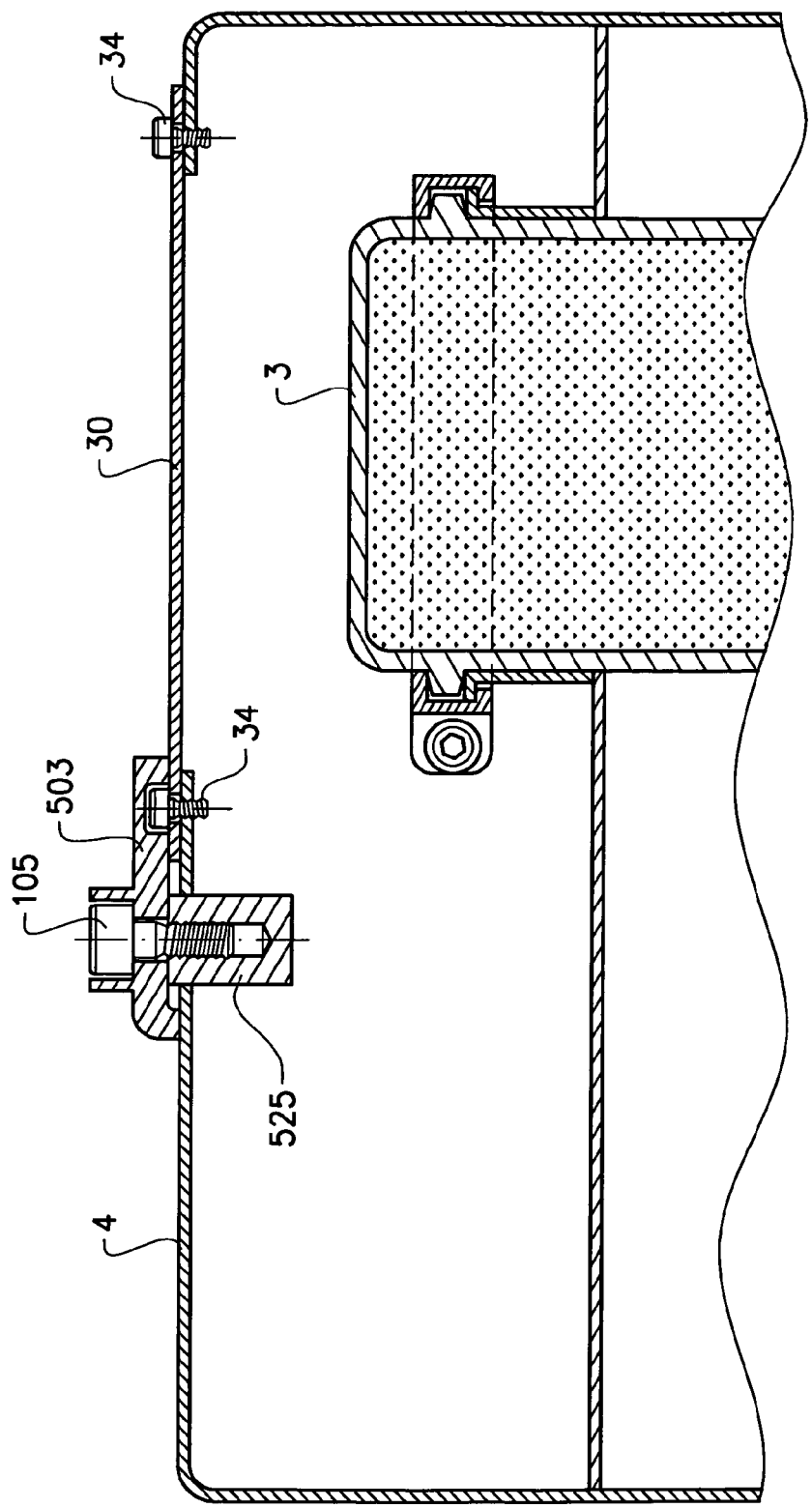

FIG. 13d shows the fifth embodiment of the anti-theft device 501 in a partly cut view.

Figure 14A:
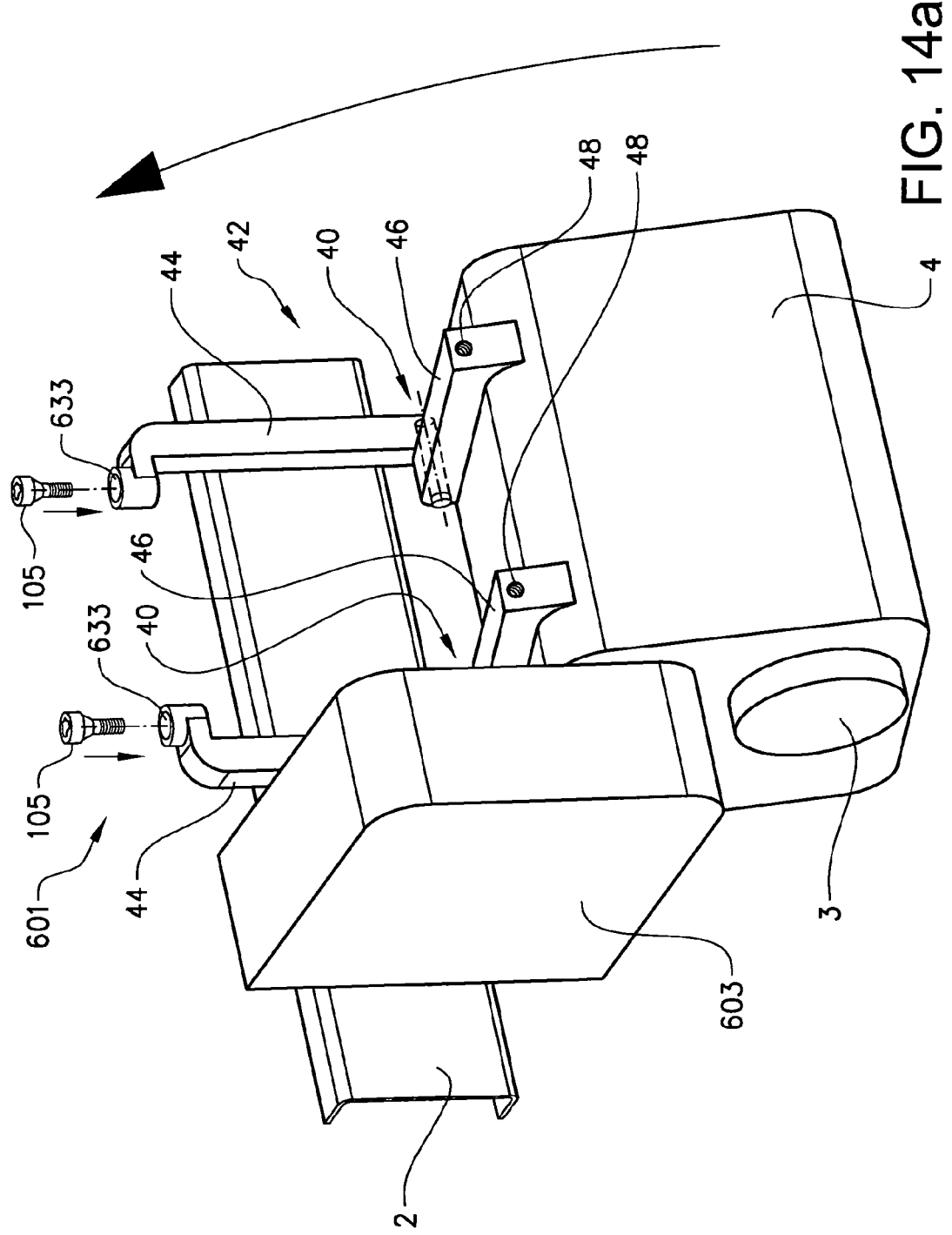

FIG. 14a-b shows a further alternative arrangement of the diesel particulate filter 3 and the muffler 4. The muffler 4 is pivotably attached to the frame member 2 via pivot means 40. The pivot means 40 has a pivot axis in parallel with a longitudinal direction of the frame member 2. Further, the pivot means 40 is provided at a lower part of the muffler 4 so that the muffler can be pivoted from an upper, operational position (see FIG. 14b), to a lower, service position (see FIG. 14a). The muffler 4 comprises an opening for the diesel particulate filter 3 extending in such a direction that the filter 3 is configured for withdrawal from the muffler in a first direction via said opening. The muffler 4 is arranged so that said withdrawal direction is in parallel with the longitudinal direction of the frame member 2.

More specifically, the muffler 4 is provided with an arrangement 42 for achieving a pivotal connection to the frame 2. The arrangement 42 comprises at least one pair of legs 44,46, wherein a first of said legs 44 is rigidly attached to the frame in an upright position (extending vertically) and a second of said legs 46 is rigidly attached to the muffler 4. The first and second legs 44, 46 are pivotably arranged in relation to each other via said pivot means 40. The first and second legs will be substantially parallel to each other when the muffler is in the upper position. Further, means 105,633, 48 are provided for locking the first and second legs to each other in said parallel relationship. Said locking means 105, 633,48 comprises a screw connection. In the embodiment shown, two pair of legs 44, 46 are arranged spaced in the longitudinal direction of the frame member 2.

FIG. 14a-b further shows a device 601 according to a sixth embodiment for preventing theft of a first vehicle component 3 (the diesel particulate filter), which is releasably connected to a second vehicle component 4 (the muffler 4). The theft preventing device 601 comprises a cover member 603 arranged for obstructing removal of said first component 3 from said second component 4 and said locking member 105, which is configured for locking the second component 4 in an operational position in which the cover member 603 obstructs said removal of said first component 3 from said second component 4. More specifically, the cover member 603 is configured for obstructing withdrawal of the first component 3 from the second component 4 when the second component (the muffler) is locked to the frame member 2. Further, the pivoting means 42 is configured so that the first vehicle component (the filter) 3 will be accessible, ie not covered by the cover member 603 when the muffler 4 is in the lower position. More specifically, the pivoting means 42 is configured so that the first vehicle component (the filter) 3 will be accessible from below the cover member 603 when the muffler 4 is in the lower position.

The cover member 603 may form part of another active vehicle component.

More specifically, in the FIGS. 14a-b, the locking member 105 is configured for releasably locking the second component 4 to the frame member 2. Further, the cover member 603 is configured for being rigidly connected to the frame member 2 such that the cover member 603 obstructs separation of said first component 3 from said second component 4 when the second component 4 is locked to the frame.

According to a further aspect of the invention, it comprises a vehicle arrangement, which comprises a first vehicle component and a second vehicle component, wherein the first component is releasably connected to the second vehicle component, and wherein the vehicle arrangement comprises a device for preventing theft of the first vehicle component according to any one of the above mentioned embodiments. The second vehicle component comprises said lock portion (boss or projection) for attachment of the cover member via the locking member 105.

According to a further aspect of the invention, it comprises a vehicle 1, which in turn comprises a vehicle arrangement according to any one of the above mentioned embodiments. Said second component 4 is then fastenable to said frame.

The invention must not be regarded as being limited to the examples of embodiment described above, a number of further variants and modifications being feasible without departing from the scope of the following claims.

For example, the invention may be realized for different designs and arrangements of the muffler and the diesel particulate filter than the ones shown in the drawings.

Further, the first vehicle component is not limited to a diesel particulate filter, but may be formed by any other vehicle component liable to be stolen, which is configured to be attached to another vehicle component, such as the frame. Especially, the first vehicle component may be formed by another gas aftertreatment unit, such as a selective catalytic reduction unit or an oxidation catalyst unit.

Further, the second vehicle component is not limited to be formed by a sound dampening device or muffler, but may be formed by any other vehicle component configured to house or in any other way form a support for attaching a vehicle component liable to be stolen. The second vehicle component may for example be formed by a frame member.

The invention claimed is:

1. A device for preventing theft of a first vehicle component, wherein the first component is an exhaust gas aftertreatment unit, which is releasably connected to a second vehicle component, wherein the theft preventing device comprises a cover member configured for obstructing removal of said first component from the second component and a locking member, which is configured for locking the cover member or the second component in an operational position in which the cover member obstructs the removal of the first component from the second component, wherein the first component is fastened to the second component in an operational position via a fastener, the locking member being configured for locking the cover member for obstructing access for releasing the fastener.

2. A device according to claim 1, wherein the locking member comprises an individual engagement pattern configured for mating only with a corresponding engagement pattern of a service tool.

3. A device according to claim 1, wherein the locking member comprises a wheel lock bolt with an individual engagement pattern.

4. A device according to claim 1, wherein the locking member is configured for fastening the cover member to the second component in the operational position.

5. A device according to claim 1, wherein the second component comprises an opening for receiving the first component and wherein the first component is configured for said removal from the second component in a first direction via the opening wherein the cover member is configured for obstructing the removal of the first component from the second component, and wherein the locking member is configured for releasably locking the second component to a frame and that the cover member is configured for being rigidly connected to the frame such that the cover member obstructs the removal of the first component from the second component when the second component is locked to the frame.

6. A device according to claim 1, wherein the second component is a muffler.

7. A device according to claim 1, wherein the cover member comprises an opening for receiving the locking member.

8. A device according to claim 7, wherein the cover member is provided with a collar around the opening for receiving the locking member.

9. A device according to claim 1, wherein the second component comprises an opening for receiving the first component and wherein the first component is configured for said removal from the second component in a first direction via the opening wherein the cover member is configured for obstructing the removal of the first component from the second component.

10. A device according to claim 9, wherein the first component comprises a flange at least partly surrounding the first component wherein the cover member is configured to at least partly overlap the flange for obstructing the removal of the first component in the first direction.

11. A device according to claim 1, wherein the cover member comprises a substantially rigid ring shaped part configured for surrounding the first component.

12. A device according to claim 11, wherein the cover member comprises two ring parts and a hinge for relative motion between the two ring parts.

13. A device according, to claim 1, wherein the cover member comprises a first plate shaped portion, which is configured for obstructing the removal of the first component from the second component.

14. A device according to claim 13, wherein the cover member comprises a second plate shaped portion, which is formed in a one-piece unit with the first plate-shaped portion, that the first and second plate shaped portions extend in different directions, and that the second plate shaped portion is configured for obstructing access to the fastener.

15. A device according to claim 13, wherein the device comprises a support member, which is configured for bridging a distance between the first plate-shaped portion and a surface of the second vehicle component and that the support member is configured for being rigidly connected to the second component and mating with the locking member.

16. A vehicle arrangement comprising a first vehicle component and a second vehicle component, wherein the first component is releasably connected to the second vehicle component, wherein the vehicle arrangement comprises a device for preventing theft of the first vehicle component according to claim 1.

17. A vehicle arrangement according to claim 16, wherein the second component comprises a lock portion for engagement with the locking member.

18. A vehicle arrangement according to claim 17, wherein the lock portion forms a projection extending from a plane or curved surface of the second component and that the projection comprises a recess for attachment of the locking member to the second component.

19. A vehicle wherein it comprises a vehicle arrangement according to claim 16.

20. A vehicle according to claim 19, wherein it comprises a frame wherein the second component is fastenable to the frame.

* * * * *